(12) United States Patent
Zhai et al.

(10) Patent No.: US 9,569,107 B2
(45) Date of Patent: Feb. 14, 2017

(54) GESTURE KEYBOARD WITH GESTURE CANCELLATION

(71) Applicant: Google Inc., Mountain View, CA (US)

(72) Inventors: Shumin Zhai, Los Altos, CA (US); Kurt Edward Partridge, Palo Alto, CA (US); Xiaojun Bi, Sunnyvale, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 13/866,680

(22) Filed: Apr. 19, 2013

(65) Prior Publication Data

US 2014/0108993 A1     Apr. 17, 2014

Related U.S. Application Data

(60) Provisional application No. 61/714,715, filed on Oct. 16, 2012.

(51) Int. Cl.
*G06F 3/0489* (2013.01)
*G06F 3/0488* (2013.01)

(52) U.S. Cl.
CPC ......... *G06F 3/0489* (2013.01); *G06F 3/04886* (2013.01)

(58) Field of Classification Search
CPC .................... G06F 3/04886; G06F 3/04883
USPC ...................................................... 715/773
See application file for complete search history.

(56) References Cited

U.S. PATENT DOCUMENTS

| | | |
|---|---|---|
| 6,286,064 B1 | 9/2001 | King et al. |
| 6,292,179 B1 | 9/2001 | Lee |
| 6,801,190 B1 | 10/2004 | Robinson et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |

(Continued)

FOREIGN PATENT DOCUMENTS

WO    2008133619 A2    11/2008

OTHER PUBLICATIONS

Hinckley et al., "Sensor Synaesthesia: Touch in Motion, and Motion in Touch", Proceedings of the SIGCHI Conference on Human Factors in Computing Systems, 2011, pp. 801-810.

(Continued)

*Primary Examiner* — David Choi
(74) *Attorney, Agent, or Firm* — Shumaker & Sieffert, P.A.

(57) ABSTRACT

In one example, a method includes outputting, for display at a presence-sensitive display, a graphical user interface comprising a graphical keyboard that includes a group of keys, wherein each key in the group of keys is associated with a respective, different region of the presence-sensitive display. The method further includes receiving an indication of a gesture to select a sequence of one or more keys in the group of keys of the graphical keyboard. The method further includes determining, based at least in part on the indication of the gesture, that the gesture includes at least one feature associated with a cancellation of the selected sequence of one or more keys. The method further includes, in response to determining that the gesture includes the at least one feature associated with the cancellation, omitting the selected sequence of one or more keys from entry to a text input field.

27 Claims, 6 Drawing Sheets

(56) References Cited

U.S. PATENT DOCUMENTS

| | | | |
|---|---|---|---|
| 7,098,896 B2* | 8/2006 | Kushler | G06F 3/04883 345/168 |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |
| 7,788,606 B2 | 8/2010 | Patel et al. | |
| 7,886,236 B2* | 2/2011 | Kolmykov-Zotov | G06F 3/04883 715/856 |
| 7,921,361 B2 | 4/2011 | Gunn et al. | |
| 8,036,878 B2 | 10/2011 | Assodallahi | |
| 8,135,582 B2 | 3/2012 | Suraqui | |
| 8,225,203 B2 | 7/2012 | Unruh | |
| 8,902,198 B1* | 12/2014 | Karakotsios | G06F 3/017 345/175 |
| 2003/0017844 A1* | 1/2003 | Yu | G06F 3/0237 455/556.1 |
| 2003/0234821 A1* | 12/2003 | Pugliese | G06F 3/0237 715/816 |
| 2006/0031755 A1* | 2/2006 | Kashi | G06F 17/242 715/201 |
| 2006/0119582 A1 | 6/2006 | Ng et al. | |
| 2006/0176283 A1 | 8/2006 | Suraqui | |
| 2006/0253793 A1 | 11/2006 | Zhai et al. | |
| 2008/0316183 A1 | 12/2008 | Westerman et al. | |
| 2009/0143141 A1* | 6/2009 | Wells | G07F 17/32 463/37 |
| 2010/0036655 A1* | 2/2010 | Cecil | G06F 3/0237 704/10 |
| 2011/0122081 A1* | 5/2011 | Kushler | G06F 3/0233 345/173 |
| 2011/0181526 A1* | 7/2011 | Shaffer | G06F 9/4443 345/173 |
| 2012/0036469 A1 | 2/2012 | Suraqui | |
| 2012/0226977 A1* | 9/2012 | Lengeling | G06F 3/04883 715/702 |
| 2012/0293417 A1* | 11/2012 | Dennis | G06F 17/276 345/168 |
| 2013/0019193 A1* | 1/2013 | Rhee | G06F 3/0486 715/769 |
| 2013/0021286 A1* | 1/2013 | Sudo | G06F 3/018 345/173 |
| 2014/0015753 A1* | 1/2014 | Pai | G06F 3/04883 345/168 |
| 2014/0108993 A1* | 4/2014 | Zhai | G06F 3/0489 715/773 |

OTHER PUBLICATIONS

"Swype Launch Video—Version 1.4", Swype 2013 [online]. Retrieved from the Internet: <http://www.swype.com/category/about/about-videos/> 2 pgs.

"Swype Tips: Word Correction", YouTube, Mar. 27, 2010 [online]. Retrieved from the Internet: <http://www.youtube.com/watch?v=KcMy3G5xXGY> 2 pgs.

"SlideIT keyboard—Make It Easy to Write", YouTube, Feb. 10, 2011 [online]. Retrieved from the Internet: <http://www.youtube.com/watch?v=Tp_7bWuvQwQ> 2 pgs.

International Search Report and Written Opinion of international application No. PCT/US20113/064210, dated Dec. 6, 2013, 9 pp.

International Preliminary Report on Patentability from International Application No. PCT/US2013/064210, mailed Apr. 30, 2015, 7 pp.

* cited by examiner

GESTURE KEYBOARD WITH GESTURE CANCELLATION

CROSS-REFERENCE TO RELATED APPLICATIONS

This application claims the benefit of U.S. Provisional Application No. 61/714,715, filed Oct. 16, 2012, the entire content of which is incorporated by reference herein.

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, a computing device may present a continuous-gesture graphical keyboard (sometimes referred to as a "combo gesture keyboard," or "gesture keyboard") with which a user can interact by inputting a continuous gesture that indicates a word to be input to the computing device (e.g., by sliding his or her finger over various regions of the presence-sensitive screen associated with desired keys of the keyboard). In this way, continuous-gesture graphical keyboards allow a user to enter a word or group of words with a single gesture. As such, a continuous-gesture graphical keyboard may allow the user to achieve a certain degree of input efficiency.

However, some continuous-gesture keyboards have certain drawbacks. For example, some computing devices generate touch events when a user performs a gesture at a presence-sensitive screen at which a gesture graphical keyboard is currently displayed. The touch events may include, for example, representations of different locations of the presence-sensitive screen that have been traversed by the user's finger as she performs the gesture. However, in some examples, when the user performs tap and/or non-tap gestures with a high degree of speed and/or without high precision, the user's continuous gesture input may intersect some keys in the graphical keyboard that are not part of the user's intended input, or may not intersect all the keys that are part of the user's intended input. Accordingly, the computing device may detect and enter gesture inputs corresponding to detections of user inputs that do not correspond with the user's intended inputs. As such, gestures including a high degree of speed and/or lacking precision may result in text entry inconsistent with the user's intended inputs, thereby reducing the speed at which the user is able to interact with the computing device.

SUMMARY

In one example, a method includes outputting, by a computing device and for display at a presence-sensitive display, a graphical user interface comprising a graphical keyboard that includes a group of keys, wherein each key in the group of keys is associated with a respective, different region of the presence-sensitive display. The method further includes receiving, by the computing device, an indication of a gesture to select a sequence of one or more keys in the group of keys of the graphical keyboard. The method further includes determining, by the computing device and based at least in part on the indication of the gesture, that the gesture includes at least one feature associated with a cancellation of the selected sequence of one or more keys. The method further includes, in response to determining that the gesture includes the at least one feature associated with the cancellation, omitting, by the computing device, the selected sequence of one or more keys from entry to a text input field.

In another example, a computing system includes at least one processor. The at least one processor is configured to output, for display at a presence-sensitive display, a graphical user interface comprising a graphical keyboard that includes a group of keys, wherein each key in the group of keys is associated with a respective, different region of the presence-sensitive display. The at least one processor is further configured to receive an indication of a gesture to select a sequence of one or more keys in the group of keys of the graphical keyboard. The at least one processor is further configured to determine, based at least in part on the indication of the gesture, that the gesture includes at least one feature associated with a cancellation of the selected sequence of one or more keys. The at least one processor is further configured to, in response to determining that the gesture includes the at least one feature associated with the cancellation, omit the selected sequence of one or more keys from entry to a text input field.

In another example, a computer-readable storage medium is encoded with instructions executable by at least one processor to output, for display at a presence-sensitive display, a graphical user interface comprising a graphical keyboard that includes a group of keys, wherein each key in the group of keys is associated with a respective, different region of the presence-sensitive display. The instructions are further executable by the at least one processor to receive an indication of a gesture to select a sequence of one or more keys in the group of keys of the graphical keyboard. The instructions are further executable by the at least one processor to determine, based at least in part on the indication of the gesture, that the gesture includes at least one feature associated with a cancellation of the selected sequence of one or more keys. The instructions are further executable by the at least one processor to, in response to determining that the gesture includes the at least one feature associated with the cancellation, omit the selected sequence of one or more keys from entry to a text input field.

The details of one or more embodiments are set forth in the accompanying drawings and the description below. Other features, objects, and advantages will be apparent from the description and drawings, and from the claims.

BRIEF DESCRIPTION OF DRAWINGS

The various described features are not drawn to scale and are drawn in a simplified form in which one or more features relevant to the present application are emphasized. Like reference characters denote like elements throughout the figures and text.

DETAILED DESCRIPTION

Figure 1:
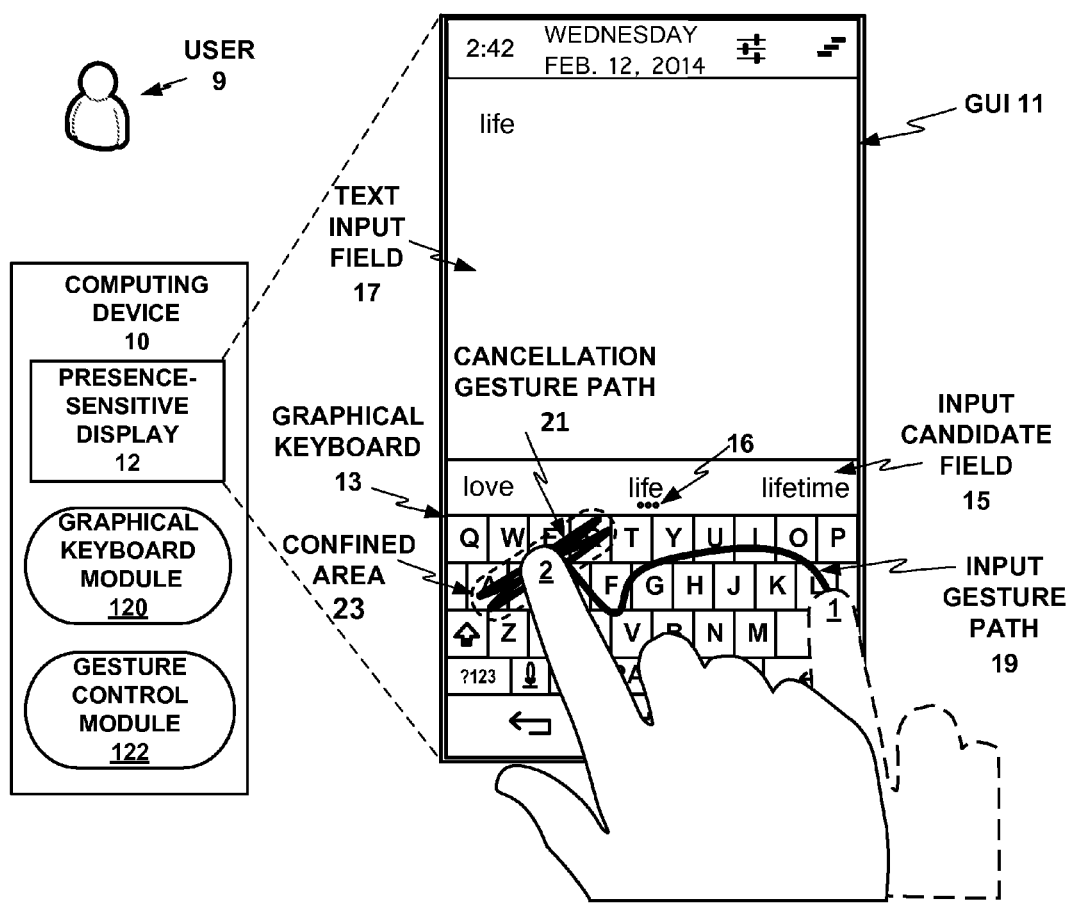
FIG. 1 is a top view diagram illustrating an example computing device configured to implement a graphical keyboard with gesture cancellation features, in accordance with illustrative aspects of this disclosure.

In general, this disclosure relates to systems, methods, techniques, and devices for providing a graphical keyboard configured to receive continuous gesture inputs and to enable features for gesture cancellation. In some examples, the computing device may determine whether features of a continuous gesture indicate cancellation of the gesture. In other words, the computing device may be configured to determine one or more gesture features of a continuous gesture input as an indication to cancel that gesture input, or to cancel one or more gesture input features entered prior to the cancellation gesture feature. As used herein, any gesture input may include a gesture component or gesture feature that is simply a gesture or a portion of a longer or more complex gesture. A gesture may include any user gesture detectable by an input device included in, communicatively coupled to, or operatively coupled to a computing device.

For example, a computing device may be configured to interpret as a cancellation gesture feature a gesture feature (e.g., a portion of a gesture) that extends outside a graphical keyboard. As another example, a computing device may be configured to interpret a gesture feature that extends to one or more selected keys of a graphical keyboard, such as the space bar or other non-character keys, as a cancellation gesture feature. As yet another example, a computing device may be configured to interpret a gesture feature that includes a wiggle or zigzag shape within a graphical keyboard as a cancellation gesture feature. As yet another example, a computing device may be configured to interpret a gesture feature that includes a path over time that extends back and forth repetitively within a confined area within a graphical keyboard as a cancellation gesture feature. In various examples, the computing device may interpret a gesture feature to be incompatible with an indication of an intended key selection gesture input or to be below a probability threshold in a user gesture input model for an intended key selection gesture input. In any of these examples, a computing device may then respond to the cancellation gesture feature by omitting a selected sequence of one or more keys indicated by preceding gesture features from entry to a text field or other input field. Therefore, in various examples, the cancellation gesture may be a portion of a continuous gesture that initially specifies a sequence of one or more keys to enter, or the cancellation gesture may be a continuous portion of a text entry gesture. In various examples, the cancellation gesture may effectively cancel an entry of a selected sequence of one or more keys prior to the selected sequence of one or more keys being entered to a text entry field.

A computing device may thereby, in some examples, enable a user to cancel a gesture input with a part of the gesture, without interrupting the process of gesture inputs. In some examples, the techniques enable a user to cancel the gesture without having to perform a separate cancellation input in a separate input mode, such as tapping in a text input field, after completing a gesture input in the graphical keyboard. A computing device enabled to respond to gesture input cancellation features may enable easier and more efficient correction of erroneous gesture keyboard inputs.

FIG. 1 is a top view diagram illustrating an example computing device 10 configured to implement a graphical keyboard with gesture cancellation features, in accordance with illustrative aspects of this disclosure. Computing device 10 includes a presence-sensitive display 12 with a graphical user interface (GUI) 11 displayed thereon. GUI 11 includes graphical keyboard 13, input candidate field 15, and text input field 17. Computing device 10 also includes graphical keyboard module 120 and gesture cancellation module 122. Graphical keyboard module 120 and gesture cancellation module 122 may be executable software instructions stored and/or executing on computing device 10. Graphical keyboard module 120 and gesture cancellation module 122 may be portions of a single software application, separate applications, application modules, libraries, or other software components. Graphical keyboard module 120 may include instructions for rendering graphical keyboard 13, input candidate field 15, and/or text input field 17 in GUI 11.

As depicted in the example of FIG. 1, user 9 traces a touch gesture at graphical keyboard 13 from a first position 1, along an input gesture path 19, to a second position 2. The first position 1 is within the area of the key for the letter "L" in the graphical keyboard 13, and the second position 2 is within the area of the key for the letter "E" in the graphical keyboard 13. Computing device 10 may detect the user's gesture along input gesture path 19 intersecting the areas of several other keys within graphical keyboard 13. Computing device 10 may process the gesture path 19 using gesture keyboard interpretation tools, such as a language model, a comparison with adjacent keys, a model of gesture input motions, and the like. Computing device 10 may determine one or more candidate words in response to the gesture input along gesture input path 19 from position 1 to position 2. Computing device 10 outputs graphical representations of one or more determined candidate words in input candidate field 15 in this example, and outputs an indication mark 16 indicating one of the candidate words as a primary or default candidate word. Computing device 10 may also output the primary candidate word for display in text input field 17, at least initially or on a contingent basis, as shown in FIG. 1.

After user 9 enters the gesture along input gesture path 19, the user may change the user's mind about what the user wants to input. User 9 may therefore decide to cancel the input of the current gesture. Computing device 10, implementing techniques of this disclosure, may enable the user to cancel the preceding gesture using a subsequent gesture, such that the user may cancel the preceding gesture in a single, fluid set of gestures. Computing device 10, using responses to inputs defined as cancellation gestures, may therefore potentially free the user from having to stop making gestures and interact with computing device 10 in a different interface mode to cancel a gesture input.

In particular, user 9 may continue to enter a gesture from position 2 back and forth along gesture path 21, within a confined area 23 of the graphical keyboard 13, which computing device 10 is configured to process as a cancellation gesture, in this example. Cancellation gesture path 21 has a zigzag shape with narrow vertices and near-parallel lines within a confined area 23, and may be analogized as a "scratching out" gesture that a user might intuitively associate with canceling a gesture or erasing an input. Computing device 10 may then respond to determining that the gesture includes a gesture cancellation feature along cancellation gesture path 21 by omitting the primary candidate word from entry to a text input field 17, in this example. Computing device 10 may omit a sequence of characters such as the primary candidate word from entry to text input field 17 by removing or deleting a graphical representation of a word from text input field 17 after initially outputting the graphical representation of the word, for example. In another example, computing device 10 may omit a sequence of characters such as the primary candidate word from entry to text input field 17 by not entering the word to text input field 17 in the first place or not outputting a graphical representation of the word in text input field 17.

Omitting a selected sequence of one or more keys from entry to a text input field may also, in some examples, include removing or deleting the selected sequence of one or more keys from a tentative text entry field, a suggestion text entry field, or a candidate text entry field, which may or may not be rendered in a display, prior to entering the selected sequence of keys to another text entry field, such as a displayed text entry field for a text message, an email, a social networking post, or other particular text entry field for a particular application or function. Omitting a selected sequence of one or more keys from entry to a text input field may also, in some examples, include initially entering the sequence of one or more characters to a displayed text entry field for a text message, an email, a social networking post, or other particular text entry field for a particular application or function, and then removing or deleting the sequence of one or more characters from the displayed text entry field for the text message, the email, the social networking post, or other particular text entry field for a particular application or function.

Computing device 10 may be configured to use various criteria to distinguish between the zigzag shape of a cancellation gesture, and other zigzag shapes of input gestures to select a sequence of keys that happen to lie along a zigzag shaped path. For example, if computing device 10 determines that multiple line segments of a zigzag shaped gesture all lie within a relatively tightly confined area (e.g., confined area 23), or that multiple vertices of a zigzag shaped gesture are positioned within relatively short distances of each other, or that the line segments of a zigzag shaped gesture are positioned within relatively short distances of each other or overlap, computing device 10 may determine that the gesture is a cancellation gesture, rather than an input gesture to select an additional sequence of keys. Computing device 10 may also combine some or all of the example criteria described above, and/or additional criteria, to determine that a gesture component is a cancellation gesture rather than an input gesture.

As another example, computing device 10 may use techniques to evaluate probabilities of a gesture being an input gesture or a cancellation gesture. For example, a gesture may include an initial gesture component (e.g., a portion of a gesture) to select a sequence of one or more keys corresponding to at least one potential word. For example, this initial gesture component may include a user's swipe gesture that touches or contactlessly indicates a path intersecting a sequence of keys at the graphical keyboard. The gesture may then include a feature or portion (i.e. a "cancellation gesture feature") associated with a cancellation of a prior portion of the gesture, in accordance with this disclosure. The cancellation gesture feature may include a gesture component, subsequent to the initial gesture component, that indicates a portion of GUI that doesn't indicate additional keys for key inputs. In some examples, the cancellation gesture feature may indicate an area of GUI 11 outside of any of the keys of graphical keyboard 13, such as text input field 17. In some examples, the cancellation gesture feature may indicate an area of GUI 11 that is still within graphical keyboard 13 but that does not form any likely text entries in combination with the prior gesture input, such as by indicating space bar 29.

In various examples, the cancellation gesture feature may indicate an area of graphical keyboard 13 that forms a sequence of keys that, in combination with the initial gesture component, is below a threshold of probability for selecting a sequence of letters to complete any potential word, as further described below. For example, a gesture input may include a "scribbling out" motion that indicates a repeating sequence of a small number of keys, such that the sequence of keys would form a repetitive sequence of letters that does not form a word. Determining that a gesture is a cancellation gesture may further include determining that a subsequent gesture component is below the threshold of probability for selecting, in combination with the initial gesture component, a sequence of letters to complete any potential word, such as in accordance with one or more language models for one or more given languages. That is, computing device 10 may compare a probabilistic model of the sequence of indicated keys with a language model, and determine that there is no potential word in the language model that corresponds with any interpretation of the sequence of keys, within a nominal probability threshold. Determining that a gesture is a cancellation gesture may further include determining that a subsequent gesture component indicates or intersects a determined location of GUI 11, a determined key of graphical keyboard 13, or repeatedly extends back and forth within a confined area of graphical keyboard 13, for example.

Computing device 10 may also be configured to process various other gestures as cancellation gestures, in addition to a back-and-forth or zigzag shaped gesture as described with reference to FIG. 1. Some additional examples of computing device 10 processing gestures as cancellation gestures are described below with reference to FIGS. 3 and 4.

In the example of FIG. 1, computing device 10 outputs GUI 11 for display at presence-sensitive display 12, such that GUI 11 includes graphical keyboard 13. Graphical keyboard 13 includes a group of keys, wherein each key in the group of keys is associated with a respective, different region of presence-sensitive display 12. Computing device 10 receives an indication of a user's gesture, along input gesture path 19 from position 1 to position 2 and then along cancellation gesture path 21, to select a sequence of one or more keys within the group of keys of graphical keyboard 13. Computing device 10 then determines, based at least in part on the indication of the gesture, that the gesture includes at least one feature associated with a cancellation of the selected sequence of one or more keys, such as the gesture feature along cancellation gesture path 21. In response to determining that the gesture includes the at least one feature associated with the cancellation, computing device 10 omits the selected sequence of one or more keys from entry to text input field 17.

Computing device 10 may be configured to determine that a gesture component having a determined path over time includes a gesture cancellation feature. Determining that the gesture includes a feature associated with the cancellation may include determining that the gesture includes the gesture component having a determined path over time. The determined path over time may constitute a sequence of detected gesture positions with corresponding indications of a time for each of the positions or at least for some of the positions. The determined path over time may include a path that extends back and forth more than once within a confined area within the graphical keyboard, such as cancellation gesture path 21 extending back and forth more than once within confined area 23 within graphical keyboard 13. Computing device 10 may evaluate whether the area corresponding to the cancellation gesture path 21 is a confined area for purposes of processing as a gesture cancellation feature by various criteria, such as whether the confined area is substantially the same width or narrower than a width of one of the keys in graphical keyboard 13, for example.

Computing device 10 may be configured to determine that a gesture component having a determined shape includes a gesture cancellation feature. Determining that the gesture includes the gesture cancellation feature associated with the cancellation may include determining that the gesture includes the gesture component having the determined shape. The determined shape may include a zigzag having first and second groups of vertices, wherein the first group of vertices are within a first confined area and the second group of vertices are within a second confined area within the graphical keyboard, such as the vertices of cancellation gesture path 21 being grouped within two smaller confined areas proximate to opposite ends of confined area 23 within graphical keyboard 13. Computing device 10 may evaluate whether the areas corresponding to the two groups of vertices of cancellation gesture path 21 are confined areas for purposes of processing as a gesture cancellation feature by various criteria, such as whether the confined areas are substantially the same size or smaller than an area of one of the keys in the graphical keyboard graphical keyboard 13, for example.

For instance, in the example of FIG. 1, the zigzag shape of cancellation gesture path 21 includes one group of vertices within a portion of the area of the graphical key for the letter "R" where the portion of area surrounding the vertices is smaller than the area of the graphical key. Similarly, the other group of vertices of the zigzag shape of cancellation gesture path 21 are positioned within a portion of the area of the graphical key for the letter "A" where the portion of area surrounding this group of vertices is also smaller than the area of the graphical key. The vertices may also be spread across the boundaries between two or more keys, while still being grouped within an area that is smaller than the area of any one key, such that computing device 10 processes a zigzag shaped gesture with this group of vertices as a cancellation gesture.

While these examples illustrate some implementation details with which computing device 10 may be configured to process gestures as cancellation gestures and respond by omitting selected sequences, computing device 10 may also use many other sets of criteria or techniques for processing particular gestures as gesture cancellation features. While the techniques above and other implementations may include details such as determining whether the area of a gesture is a confined area in accordance with selected criteria, or whether the shape of a gesture has components or characteristics that qualify for the shape of a cancellation gesture, these implementation details may not necessarily be apparent to a user, and instead may enable a user to use cancellation gestures intuitively and rapidly in the process of interacting with graphical keyboard 13.

The input device for detecting a gesture and communicating an indication of the gesture to a computing device may include a touchscreen or other presence-sensitive display (e.g., presence-sensitive display 12 of FIG. 1), an acoustic sensor, a video camera sensitive to visible, infrared, or other wavelengths of electromagnetic radiation, or other type of sensing device. The input device may communicate the indication of the gesture in any of various forms of encoded data. The computing device that receives the indication of the gesture from the input device may be interpreted as an entire device such as computing device 10, or a component of a device such as a set of processors or an individual processor that may be within or local to, or separate or remote from, the input device. A computing device may detect an input in that an input device detects the input and communicates an indication of the input to the computing device, for example.

Computing device 10 in various examples may be a smartphone, a tablet computing device, a laptop or desktop computer, a computing device in a wearable form factor such as a wristwatch or glasses computing device, or other type of computing device. Computing device 10 includes a presence-sensitive display 12 in this example. Computing device 10 outputs GUI 11 which may incorporate outputs from applications executing on computing device 10 including graphical keyboard module 120 and gesture cancellation module 122, for display at presence-sensitive display 12. Additional applications or application processes may also be executing on computing device 10 without corresponding GUI's. Additional details of example computing devices are described in further detail below with respect to subsequent figures, including the example of FIG. 2.

Figure 2:
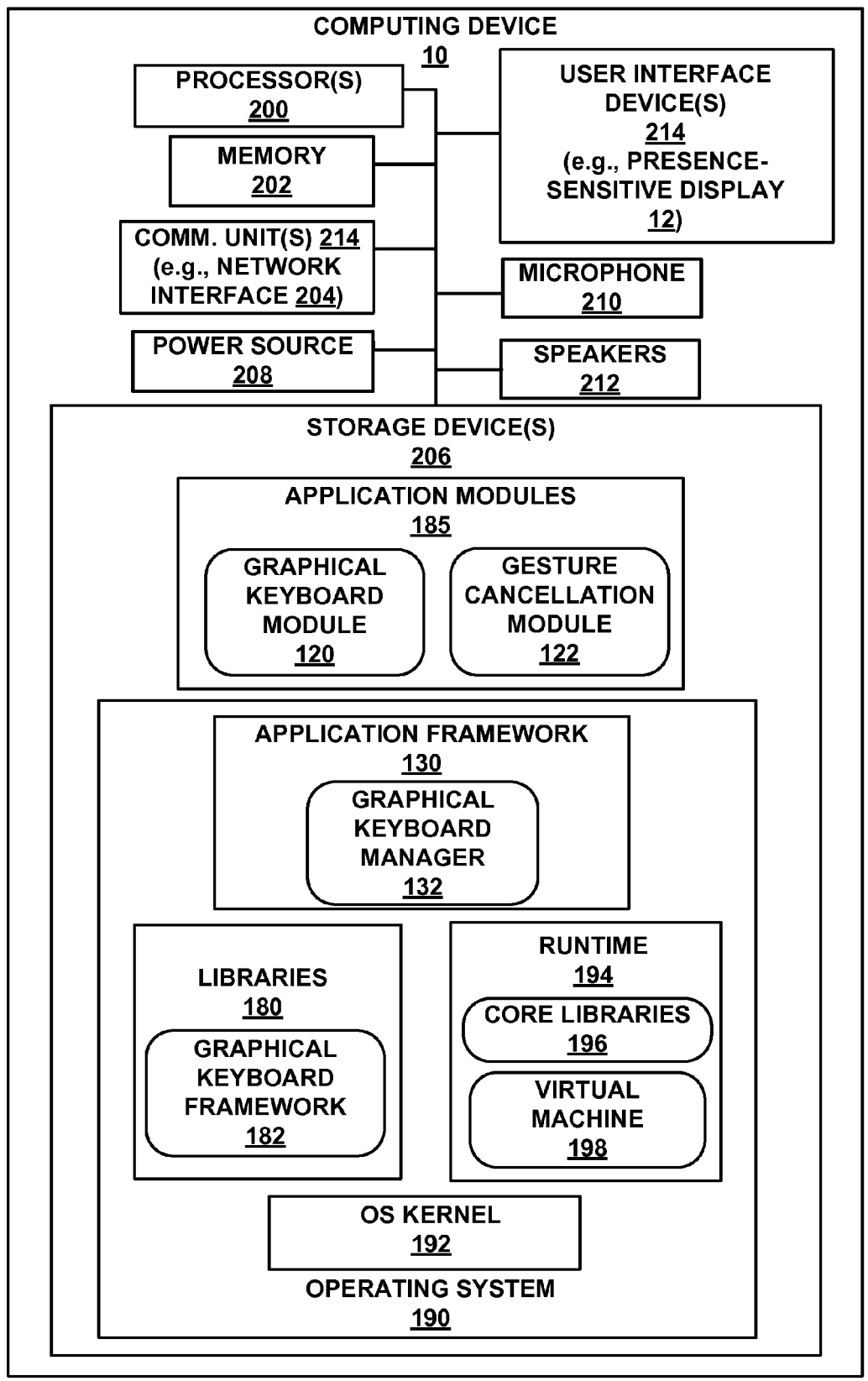
FIG. 2 is a schematic diagram of one example of the computing device shown in FIG. 1 configured to implement a graphical keyboard with gesture cancellation features, in accordance with illustrative aspects of this disclosure.

FIG. 2 is a schematic diagram of one example of the computing device 10 shown in FIG. 1 configured to implement a graphical keyboard application, in accordance with an illustrative example of this disclosure. Computing device 10 may execute a graphical keyboard module 120 and/or gesture cancellation module 122 at the level of an application or application process. Computing device 10 of the present disclosure may be implemented in a variety of forms, such as a smartphone, a tablet computing device, or a wearable computing device, for example. One or more components of example computing device 10 may be optional in different implementations, and various implementations may include additional components beyond those depicted in FIG. 2, or omit one or more of the components depicted in FIG. 2. Although shown in FIGS. 1 and 2 as a stand-alone computing device for purposes of example, computing device 10 may be any component or system that includes one or more processors (e.g., one or more processors 200) or other suitable computing environment for executing software instructions and, for example, need not necessarily include one or more of the elements shown in FIGS. 1 and 2 (e.g., presence-sensitive display 12).

Computing device 10 may include various components including one or more processors 200, memory 202, one or more communication unit(s) 216 (e.g., network interface 204), one or more data storage devices 206, power source 208, one or more microphones 210, one or more speakers 212, and one or more user interface devices 214, such as presence-sensitive display 12. Each of the components 200, 202, 216, 204, 206, 208, 210, 212, and 12 may be interconnected (physically, communicatively, and/or operatively) in any of a variety of physical and/or communicative connection means for inter-component communications, and each one may refer to one or more components.

User interface devices 214 may include one or more input devices and one or more output devices. Presence-sensitive display 12, microphone 210, and speakers 212 are illustrative examples of user interface devices 214 included in computing device 10. Presence-sensitive display 12, in some examples, may generate a signal corresponding to the position or positions of the input unit, potentially including how the position changes over time. Presence-sensitive display 12 may include one or more input and/or output devices such as a touchscreen or other touch-sensitive display, a proximate-gesture-sensitive display sensitive to gesture inputs that are proximate but not necessarily in contact, a display device and one or more cameras, or other implementations. Presence-sensitive display 12 may include a liquid crystal display (LCD) display screen or display screen that uses another type of graphical output technology. Presence-sensitive display 12 may also be a touchscreen that may include an electrically capacitive layer sensitive to the presence of user contacts and configured to translate the positions of user contact touch gesture inputs, and the motions of touch gesture inputs as they change position over time, into signals to provide to a driver for the touchscreen or other feature for receiving information on the gesture inputs. Presence-sensitive display 12 may also include a portion of a computing device having a wearable form factor such as a glasses or wristwatch form factor, for example. Presence-sensitive display 12 may also be another type of presence-sensitive display in other examples.

In some examples, presence-sensitive display 12 may detect an object at and/or near the screen of presence-sensitive display 12. In various examples, presence-sensitive display 12 may detect contact gestures on a touchscreen or non-contact gestures proximate to or remote from a gesture detection device. As one non-limiting example range, presence-sensitive display 12 may detect an object, such as a finger or stylus, which is within two inches or less of the physical screen of presence-sensitive display 12. Presence-sensitive display 12 may determine a location (e.g., an (x, y) coordinate) of presence-sensitive display 12 at or near which the object was detected. In other non-limiting example range, presence-sensitive display 12 may detect an object six inches or less from the physical screen of the display, or six feet or less from the physical screen of the display, or at any distance within detection range of an optical, acoustic, capacitance, or other type of gesture input detection device. Presence-sensitive display 12 may determine the location selected by the object (e.g., user's finger) using capacitive, inductive, and/or optical recognition techniques. In some examples, presence-sensitive display 12 provides output using tactile, audio, or video stimuli.

Presence-sensitive display 12 may be or include both an input device and an output device that generates one or more signals corresponding to a location selected by a gesture input performed by the user at or near the presence-sensitive screen 12. In some examples, presence-sensitive display 12 may detect a presence of an input unit, e.g., one or more fingers, a pen, or a stylus, that may come in contact with presence-sensitive display 12, or that may be proximate to but not in physical contact with presence-sensitive display 12. A "gesture input" may therefore refer to a proximate presence that is detected by presence-sensitive display 12, or to a physical contact with presence-sensitive display 12, e.g., in the case of a touch-sensitive screen. Various embodiments may include various types of presence-sensitive display such as a device that reads gesture inputs by visual, acoustic, remote capacitance, or other type of signals, and which may also process user gesture inputs detected by visual, acoustic, remote capacitance, etc. signals with pattern recognition software or other means to derive program inputs from user input signals.

Presence-sensitive display 12 may provide signals it generates based on user gesture inputs as data to user graphical keyboard module 120 and/or gesture cancellation module 122, and/or to other application modules 185 executing on computing device 10 or components of computing device 10. One or more intermediary applications or operating system components of computing device 10 may also filter or process the signals generated via presence-sensitive display 12 before conveying filtered or processed input signals to the graphical keyboard module 120 and/or gesture cancellation module 122 or another one or more applications or components.

Computing device 10 has operating system 190 stored on one or more storage devices 206, which may be executed by one or more processors 200. Operating system 190, in various examples, may control aspects of the operation of components of computing device 10, and facilitate operation of higher-level software application modules 185. Computing device 10, in this example, has application modules 185 that may include a graphical keyboard module 120 and/or gesture cancellation module 122 that is executable by computing device 10. Graphical keyboard module 120 and/or gesture cancellation module 122 may include executable instructions to perform or facilitate any or all of the gesture cancellation and other gesture keyboard features and behavior discussed in this disclosure, or any other aspects of this disclosure. Operating system 190, in one example, may facilitate the interaction of graphical keyboard module 120 and/or gesture cancellation module 122 with any or all of processors 200, memory 202, communication unit(s) 216 (e.g., network interface 204), data storage device 206, power source 208, one or more microphones 210, one or more speakers 212, and presence-sensitive display 12.

Graphical keyboard module 120 and/or gesture cancellation module 122 may include executable instructions to receive gesture inputs and to generate text outputs based on the gesture inputs. Graphical keyboard module 120 and/or gesture cancellation module 122 may include executable instructions to receive gesture cancellation inputs and to respond to gesture cancellation inputs by cancelling candidate text strings instead of entering the candidate text strings to a text display GUI or a text input feature of an application. Graphical keyboard module 120 and/or gesture cancellation module 122 may also include executable instructions to perform or facilitate any or all of the gesture keyboard features or behavior discussed in this disclosure, or any other aspects of this disclosure.

Graphical keyboard module 120 and/or gesture cancellation module 122 may each be an independent application or application process, and graphical keyboard module 120 and/or gesture cancellation module 122 may each also collect or receive data from other applications from among application modules 185, in some examples. Graphical keyboard module 120 and/or gesture cancellation module 122 may also be portions of executable code within a single application or application process, in some examples. Graphical keyboard module 120 and/or gesture cancellation module 122 may also be an add-on that is integrated with one or more of application modules 185. Part or all of the functions of graphical keyboard module 120 and/or gesture cancellation module 122 may also be performed, supported, or facilitated by portions of the operating system 190, as further described below.

Graphical keyboard module 120 and/or gesture cancellation module 122 may include program instructions and/or data that are executable by computing device 10 or by at least one of the one or more processors 200 of computing device 10. For example, graphical keyboard module 120 and/or gesture cancellation module 122 may include computer-executable software instructions that cause computing device 10 to perform any one or more of the operations and actions described in the present disclosure. In various examples, operating system 190 and graphical keyboard module 120 and/or gesture cancellation module 122 may include code and/or data that are stored on one or more data storage devices 206 and that are read and executed or processed by one or more processors 200, and may in the process be stored at least temporarily in memory 202.

In the illustrative example of computing device 10 depicted in FIG. 2, operating system 190 may include an operating system kernel 192, which may include various device drivers, kernel extensions, and kernel modules, for example. Operating system 190 may also include or interact with a set of libraries 180, which may include various more or less standard, specialized, open source, and/or proprietary libraries. These may include a specialized library, such as graphical keyboard framework 182, that may perform or support graphical keyboard functions (e.g., gesture cancellation) in accordance with any of the examples described herein. Performing or supporting graphical keyboard functions in the operating system 190 such as with graphical keyboard framework 182, rather than only at the level of a top-layer application, may potentially enable gesture input interactions including gesture inputs and gesture cancellations with faster or more computationally efficient performance, closer or more reliable integration with other applications from among application modules 185, or other advantages in some implementations.

In an illustrative example of computing device 10, such as that depicted in FIG. 2, operating system 190 may also include or interact with a runtime 194, which may include various core libraries 196 and/or a virtual machine 198, such as the Dalvik virtual machine in an example implementation. Virtual machine 198 may abstract certain aspects and properties of computing device 10 and allow higher-level application modules 185 to execute in the environment of virtual machine 198, so that software code in the higher-level application modules 185 may be compiled into bytecode to be executed by the virtual machine 198. Virtual machine 198 may then compile the instructions into native machine code of any one or more processors 200 of computing device 10, which may include optimizations specific to those processors 200. Computing device 10 may also have an application framework 130 that executes on top of runtime 194 and libraries 180 and that may include resources to facilitate the execution of application modules 185 that execute on top of application framework 130. Other embodiments may include other elements of a software stack between the operating system kernel 192 and the top-level application modules 185.

Application framework 130 may, for example, include a graphical keyboard manager 132 that itself may include executable instructions to perform or facilitate any or all of gesture cancellation functions in a gesture keyboard, or any other aspects of this disclosure. Performing or supporting gesture keyboard functions in the application framework 130 such as with graphical keyboard manager 132, whether or not in combination with graphical keyboard framework 182, may also enable gesture input interaction including gesture cancellation with faster or more computationally efficient performance or other advantages in some implementations. Computing device 10 may perform or facilitate any graphical keyboard functions described herein with any one or all of the graphical keyboard module 120, gesture cancellation module 122, graphical keyboard manager 132 in the application framework 130, graphical keyboard framework 182 in the libraries 180, or any other element of a software stack included in or operatively accessible to computing device 10.

In various examples, executable instructions for applications or software elements such as graphical keyboard module 120 and/or gesture cancellation module 122 may be written in executable instructions that may be executable as native code by computing device 10. In various examples, executable instructions for applications or software elements such as graphical keyboard module 120 and/or gesture cancellation module 122 may be written in a high-level programming language, then compiled to virtual-machine-executable bytecode to be executed by virtual machine 198, ultimately to be executed as native code by computing device 10 under the abstraction of virtual machine 198, as another example. In another illustrative example, executable instructions for applications or software elements such as graphical keyboard module 120 and/or gesture cancellation module 122 may be compiled from a higher level language such as JavaScript directly into native machine code for execution by one or more processors. In another illustrative example, libraries 180 may include the Standard C Library (libc) or another C library, which provides native support for C functions, and graphical keyboard module 120 and/or gesture cancellation module 122 may be written in C and be supported by libc in libraries 180.

In different implementations, the operating system 190 and/or the virtual machine 198 may be able to execute code written in various other languages such as C++, Go, JavaScript, Dart, Python, Ruby, or Clojure, to name only a few non-limiting examples, either natively, or compiled into a virtual machine-executable bytecode or an intermediate language, or compiled into an assembly language or machine code native to one or more of the processors 200 of computing device 10, potentially using just-in-time (JIT) compilation, for example. Various examples may not use a virtual machine or an intermediate language, and may use applications that execute natively on the computing device 10 or that use some other technique, compiler, interpreter, or abstraction layer for interpreting a higher-level language into code that executes natively on computing device 10.

Graphical keyboard framework 182, libraries 180, or other aspect of operating system 190 or the software stack underlying the application modules 185 may include code for providing any or all of the functionality for performing gesture cancellation for graphical keyboard inputs in accordance with any of the examples described herein, and may abstract this functionality at an underlying level for application modules 185. Code for implementing the functionality of any of the aspects of this disclosure may therefore be included in any level or portion of the entire software stack that executes on computing device 10, or that is operatively accessible to computing device 10, such as in a web application or other program executing on resources outside of computing device 10 but that interact with computing device 10, such as via Hypertext Transfer Protocol (HTTP) over a wireless connection, for example.

In various examples, computing device 10 may also have various application programming interfaces (APIs) that are native to operating system 190 and that execute on top of operating system 190, and which are intended to provide resources that automate or facilitate higher-level applications that access the one or more APIs. These one or more APIs may include object libraries or other libraries, toolsets, or frameworks, and may be associated with a native programming environment for writing applications. Computing device 10 may also have a different specific organization of APIs, libraries, frameworks, runtime, and/or virtual machine associated with or built on top of operating system 190 other than the example organization depicted in FIG. 2.

Higher-level applications, such as graphical keyboard module 120 and/or gesture cancellation module 122, may therefore make use of any of various abstractions, properties, libraries, or lower-level functions that may be provided by any of operating system 190, OS kernel 192, libraries 180, graphical keyboard framework 182, runtime 194, core libraries 196, virtual machine 198, application framework 130, graphical keyboard manager 132, or other compilers, interpreters, frameworks, APIs, or other types of resources, or any combination of the above, with which computing device 10 is configured, to enable functions such as gesture cancellation functions in a graphical keyboard, and other functions as described herein.

The one or more processors 200, in various examples, may be configured to implement functionality and/or process instructions for execution within computing device 10. For example, processors 200 may be capable of processing instructions stored in memory 202 or instructions stored on data storage devices 206. Computing device 10 may include multiple processors, and may divide certain tasks among different processors. For example, processors 200 may include a central processing unit (CPU), which may have one or more processing cores. Processors 200 may also include one or more graphics processing units (GPUs) and/or additional processors. Processors 200 may be configured for multi-threaded processing. Processors 200 and/or operating system 190 may divide tasks among different processors or processor cores according to various criteria, and various tasks or portions of tasks may also be divided among different layers of software and hardware.

Memory 202, in various examples, may be configured to store information within computing device 10 during operation. Memory 202, in various examples, may include a computer-readable storage medium. In various examples, memory 202 is a temporary memory, and computing device 10 may rely more on one or more data storage devices 206 than memory 202 for long-term storage. Memory 202, in various examples, may be a volatile memory, meaning that memory 202 does not maintain stored contents for a long duration of time once it is powered down, such as when computing device 10 is turned off. Examples of volatile memories that may characterize memory 202 include random access memories (RAM), dynamic random access memories (DRAM), static random access memories (SRAM), and other forms of volatile memories. In various examples, memory 202 may be used to store program instructions for execution by processors 200. Memory 202, in various examples, may be used by software or applications executing on computing device 10 to temporarily store data and/or software code during execution of an application.

One or more data storage devices 206, in various examples, may include a computer-readable storage medium or multiple computer-readable storage media. Data storage devices 206 may be configured to store larger amounts of information than memory 202. Data storage devices 206 may further be configured for long-term storage of information. In various examples, data storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 202 may also be configured for long-term data storage, and any of a variety of technologies may blur the lines between memory and data storage, and between volatile and non-volatile. Memory 202 and data storage devices 206 may also include different levels of caches and any of various buffers or other temporary memories that may be incorporated at any of various levels of a processing architecture and with various latency and capacity profiles, including dedicated caches exclusive to specific processing cores or processing chips, for example.

Computing device 10, in various examples, may also include one or more communication unit(s) 216 (e.g., network interface 204). Computing device 10, in some examples, use communication unit(s) 216 to communicate with external devices, such as servers or data centers, via one or more networks, which may include one or more wireless networks. Network interface 204 may be or include a network interface card, such as an Ethernet card, an optical transceiver, a radio frequency transceiver, or any other type of component that is configured to send and receive information. Other examples of such network interfaces may include Bluetooth®, 3G, 4G, LTE, and WiFi® radios configured for mobile computing devices, as well as Universal Serial Bus (USB). In various examples, computing device 10 may use communication unit(s) 216 to communicate wirelessly with an external device such as a server or data center that may provide data to computing device 10.

Computing device 10 may also include or be configured to connect with any of a variety of other input and/or output devices such as speakers, microphones, physical buttons, a virtual or physical keyboard or keypad, a mouse, a touchpad, a trackball, a voice user interface system, an acoustic vibration sensor, a sound card, a video graphics adapter card, a video camera connected to a video gesture input interpretation system, or any other type of device for detecting and/or interpreting inputs from a user or for converting a signal into a form of graphical, audio, tactile, or other form of user output that can be sensed by a user. These may be included in user interface devices 214 as part of computing device 10, and may also include separate and/or remote devices operatively connected to computing device 10.

Computing device 10, in various examples, may include one or more power sources 208, which may be rechargeable and provide power to computing device 10. Power source 208, in various examples, may be a lithium-ion battery, a nickel-cadmium battery, a nickel-metal hydride battery, or other suitable power source.

Computing device 10 is thus one illustrative example of a computing device to implement a graphical keyboard with gesture cancellation features in the form of graphical keyboard module 120, gesture cancellation module 122, graphical keyboard manager 132, and/or graphical keyboard framework 182 of FIG. 2 (hereafter collectively, "module 120/122/132/182"), and as illustratively shown in operation in FIG. 1. Computing device 10 or other computing device implementations may have one or more applications executing thereon that may implement any or all features of a graphical keyboard with gesture cancellation features.

Figure 3:
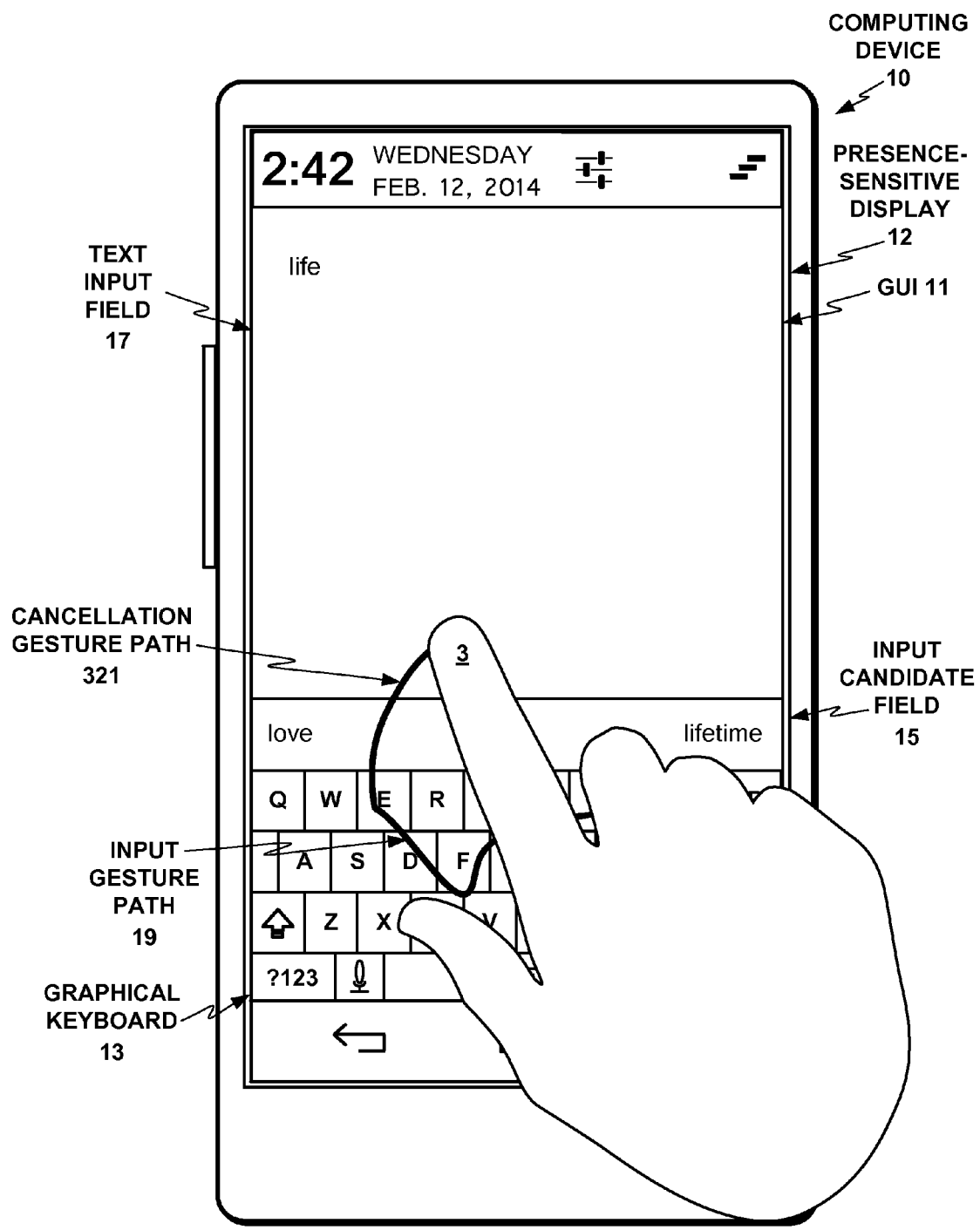
FIG. 3 is a top view diagram illustrating an example computing device configured to implement a graphical keyboard with additional gesture cancellation features, in accordance with illustrative aspects of this disclosure.

FIG. 3 is a top view diagram illustrating an example computing device 10 configured to implement a graphical keyboard with additional gesture cancellation features, in accordance with illustrative aspects of this disclosure. Computing device 10 outputs GUI 11 at presence-sensitive display 12 for a user to interact with a graphical keyboard 13, similarly to the features described above with reference to FIG. 1. In the example of FIG. 3, the user initially makes the same input gesture along the input gesture path 19 beginning in the area of graphical keyboard 13 for the key for the letter "L" and proceeding to the key for the letter "E", before the user decides to cancel the gesture, as described above with reference to FIG. 1. In this example, the user continues the gesture in an upward direction from the key for the letter "E", out of the graphical keyboard 13, into the input candidate field 15 and then into the text entry field 17 to position 3.

Computing device 10 processes the gesture portion along gesture path 321, proceeding up into the area of text input field 17, as a cancellation gesture in this example. This is one example of various implementations in which computing device 10 may process a gesture extending outside of graphical keyboard 13 as a cancellation gesture. Computing device 10 determines, based at least in part on data from presence-sensitive display 12 indicating information about the gesture, that the gesture includes the gesture portion extending along gesture path 321 into text input field 17, which computing device 10 processes as a cancellation gesture, in this example. Computing device 10 then responds to determining that the gesture includes the cancellation gesture extending along cancellation gesture path 321 by omitting the candidate word formed by the preceding selected sequence of keys from entry to text input field 17, such as by removing or deleting the candidate word from text input field 17.

Figure 4:
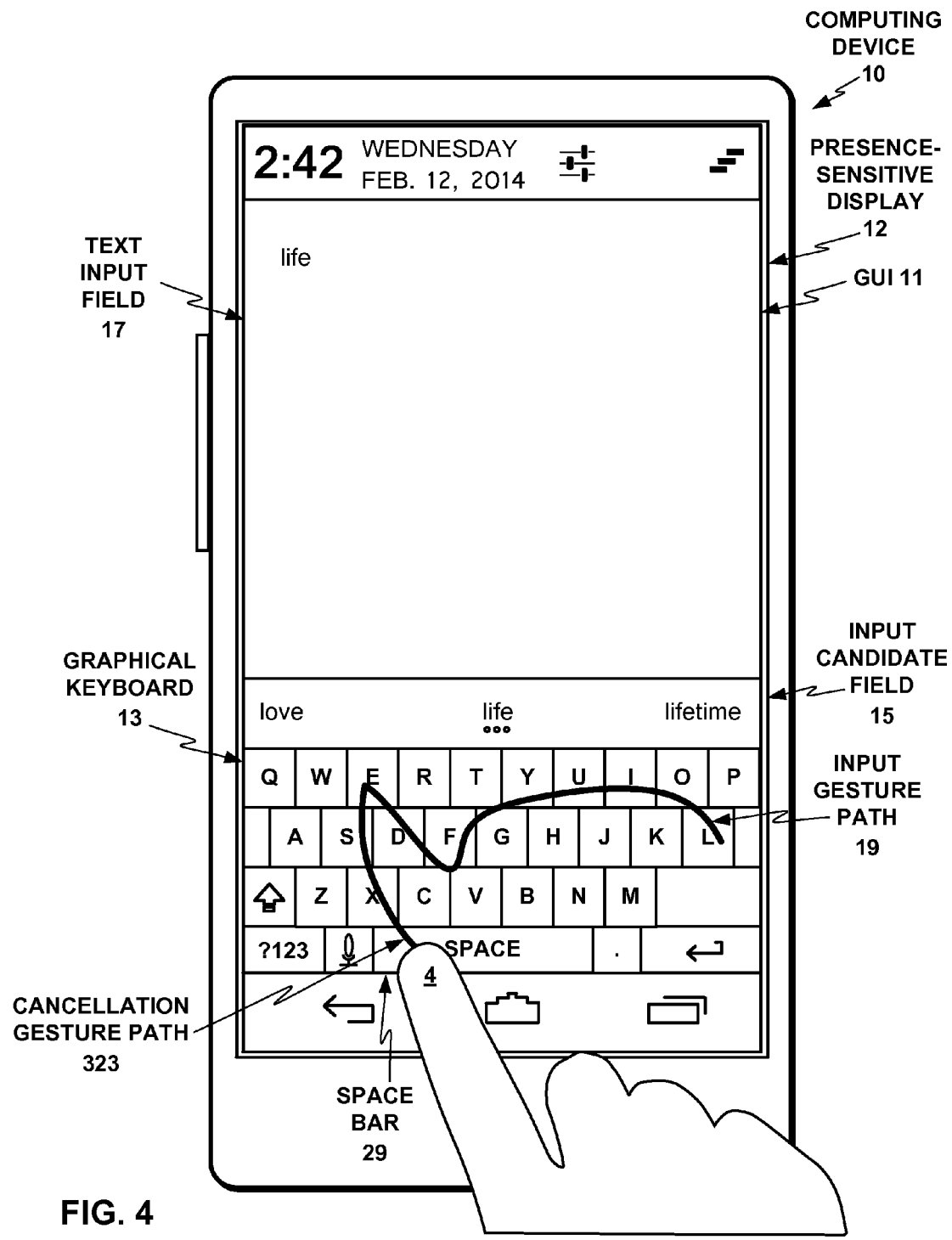
FIG. 4 is a top view diagram illustrating an example computing device configured to implement a graphical keyboard with additional gesture cancellation features, in accordance with illustrative aspects of this disclosure.

FIG. 4 is a top view diagram illustrating an example computing device configured to implement a graphical keyboard with additional gesture cancellation features, in accordance with illustrative aspects of this disclosure. Computing device 10 outputs GUI 11 at presence-sensitive display 12 for a user to interact with a graphical keyboard 13, similarly to the features described above with reference to FIGS. 1 and 3. In the example of FIG. 4, the user initially makes the same input gesture along the input gesture path 19 beginning in the area of graphical keyboard 13 for the key for the letter "L" and proceeding to the key for the letter "E", before the user decides to cancel the gesture, as described above with reference to FIGS. 1 and 3. In this example, the user continues the gesture in a downward direction from the key for the letter "E", into the area of graphical keyboard 13 corresponding to the space bar 29, to position 4. Computing device 10 processes the gesture portion along gesture path 323, proceeding into the area of space bar 29, as a cancellation gesture in this example. This is one example of various implementations in which computing device 10 may process a gesture that intersects a determined one or more keys of graphical keyboard 13 as a cancellation gesture. Computing device 10 determines, based at least in part on data from presence-sensitive display 12 indicating information about the gesture, that the gesture includes the gesture portion extending into space bar 29, which computing device 10 processes as a cancellation gesture, in this example. Computing device 10 then responds to determining that the gesture includes the cancellation gesture extending along cancellation gesture path 323 by omitting the candidate word formed by the preceding selected sequence of keys from entry to text input field 17, as described above. Computing device 10 may also be configured to process a gesture that intersects other non-character keys of graphical keyboard 13 as a cancellation gesture, where space bar 29 may be one example of a non-character key the area of which may correspond to a cancellation gesture. Other non-character keys may include a microphone key, a return key, or a caps lock key, as a few illustrative examples. Such keys may be selected normally by ending one gesture and then selected the key separately, while the keys may be used for gesture cancellation if selected as a part of a gesture already in progress, in some examples.

In various examples, a computing device may cancel a gesture input in response to an indication that the gesture indicates a path (e.g., an input gesture path) from within a graphical keyboard to an edge of the keyboard or to outside of the keyboard. For example, gesture path 321 shown in FIG. 2 is a path that extends from within the graphical keyboard to outside the graphical keyboard. Computing device 10 may determine that gesture path 321 extends from within the graphical keyboard 13 to outside the graphical keyboard 13, and in response, determine that gesture path 321 has a cancellation feature, and cancel the input of the selected keys determined from the earlier portion of gesture path 321. In other examples, computing device 10 may determine that a path that extends from within the graphical keyboard to an edge of the graphical keyboard constitutes a cancellation feature. In these examples, computing device 10 may determine that gesture path 321 shown in FIG. 3 extends from within graphical keyboard 13 to the edge of graphical keyboard 13 (in particular, at the top edge of the graphical key for the letter "E" as depicted in FIG. 3, in this example). Computing device 10 may then determine that gesture path 321 has a cancellation feature because gesture path 321 extends from within the graphical keyboard to an edge of the graphical keyboard.

In various examples, a computing device may determine that a gesture input path that extends from within graphical keyboard to an edge of the graphical keyboard or to outside of the graphical keyboard has an input cancellation feature, regardless of what part of the edge of the keyboard the path extends to, or where outside of the graphical keyboard the path extends to. For example, computing device 10 may also receive an indication that the gesture path extends from within graphical keyboard 13 to or outside of a top edge, a left or right side edge, or a bottom edge of graphical keyboard 13. Extending to an edge of or to outside of graphical keyboard 13 may or may not also include extending to an edge of or extending outside of the area of a presence-sensitive display 12 or otherwise outside the range of a presence-sensitive input device, without affecting a determination by the computing device that the gesture input path has extended to an edge of or outside of graphical keyboard 13, in various examples.

A computing device may implement any or all of the gesture cancellation features described with reference to FIGS. 1, 3, and 4 and/or other gesture cancellation features in execution of a graphical keyboard, and enable a user to use any one or more gesture cancellation features to cancel a gesture. A computing device may enable one or more selected gesture cancellation features by default, and may also enable one or more additional gesture cancellation features to be activated optionally by a user.

Figure 5:
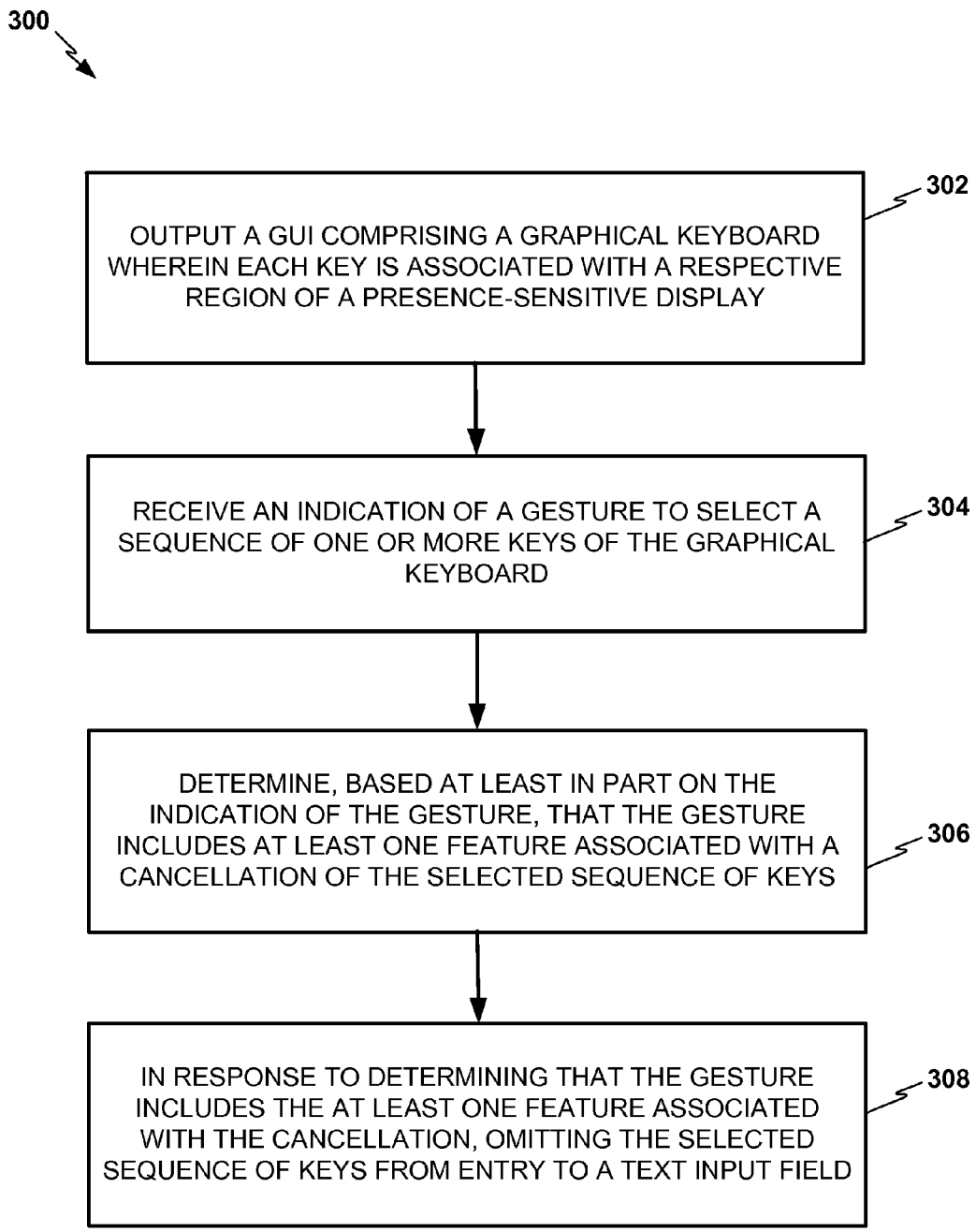
FIG. 5 is a flow diagram illustrating an example process that may be performed by or that may be embodied by a computing system to implement a graphical keyboard with gesture cancellation features, in accordance with illustrative aspects of this disclosure.

FIG. 5 is a flow diagram illustrating an example process 300 or method that may be performed by or be embodied in a computing device, such as computing device 10 of FIGS. 1-4, or any one or more processors 200 of computing device 10 as shown in FIG. 2, for example, to implement gesture cancellation features in accordance with aspects of this disclosure. Process 300 is only one example, and other implementations may include more or fewer elements or features than those depicted in FIG. 5. Process 300 is described below with reference to various features depicted and described with reference to any or all of FIGS. 1-4, such as one or more processor(s) 200 of FIG. 2, presence-sensitive display 12 of FIGS. 1-4, and graphical keyboard 13 of FIGS. 1, 3, and 4, for example.

In process 300, a device such as computing device 10 or one or more processor(s) 200 thereof (for example) may execute instructions, such as those of graphical keyboard module 120 and/or gesture cancellation module 122. In the example below, one or more processor(s) 200 may execute graphical keyboard module 120 and/or gesture cancellation module 122, as a representative example. In this example, making reference to elements of the earlier figures, a device, such as one or more processor(s) 200, may output, for display at a presence-sensitive display (e.g., presence-sensitive display 12), a graphical user interface (e.g., GUI 11) comprising a graphical keyboard (e.g., graphical keyboard 13) that includes a group of keys, wherein each key in the group of keys is associated with a respective, different region of the presence-sensitive display (302). The device, such as one or more processor(s) 200, may also receive an indication of a gesture to select a sequence of one or more keys within the group of keys of the graphical keyboard (304). The device, such as one or more processor(s) 200, may also determine, based at least in part on the indication of the gesture, that the gesture includes at least one feature associated with a cancellation of the selected sequence of one or more keys (e.g., gesture cancellation features 21, 321, 323) (306). The device, such as one or more processor(s) 200, may, in response to determining that the gesture includes the at least one feature associated with the cancellation, omit the selected sequence of one or more keys from entry to a text input field (e.g., text input field 17) (308). The device, such as computing device 10 or computing device components thereof (e.g., one or more processor(s) 200), or other processors or devices, may further perform any of the functions and processes described with reference to FIGS. 1-4 and FIG. 6.

Figure 6:
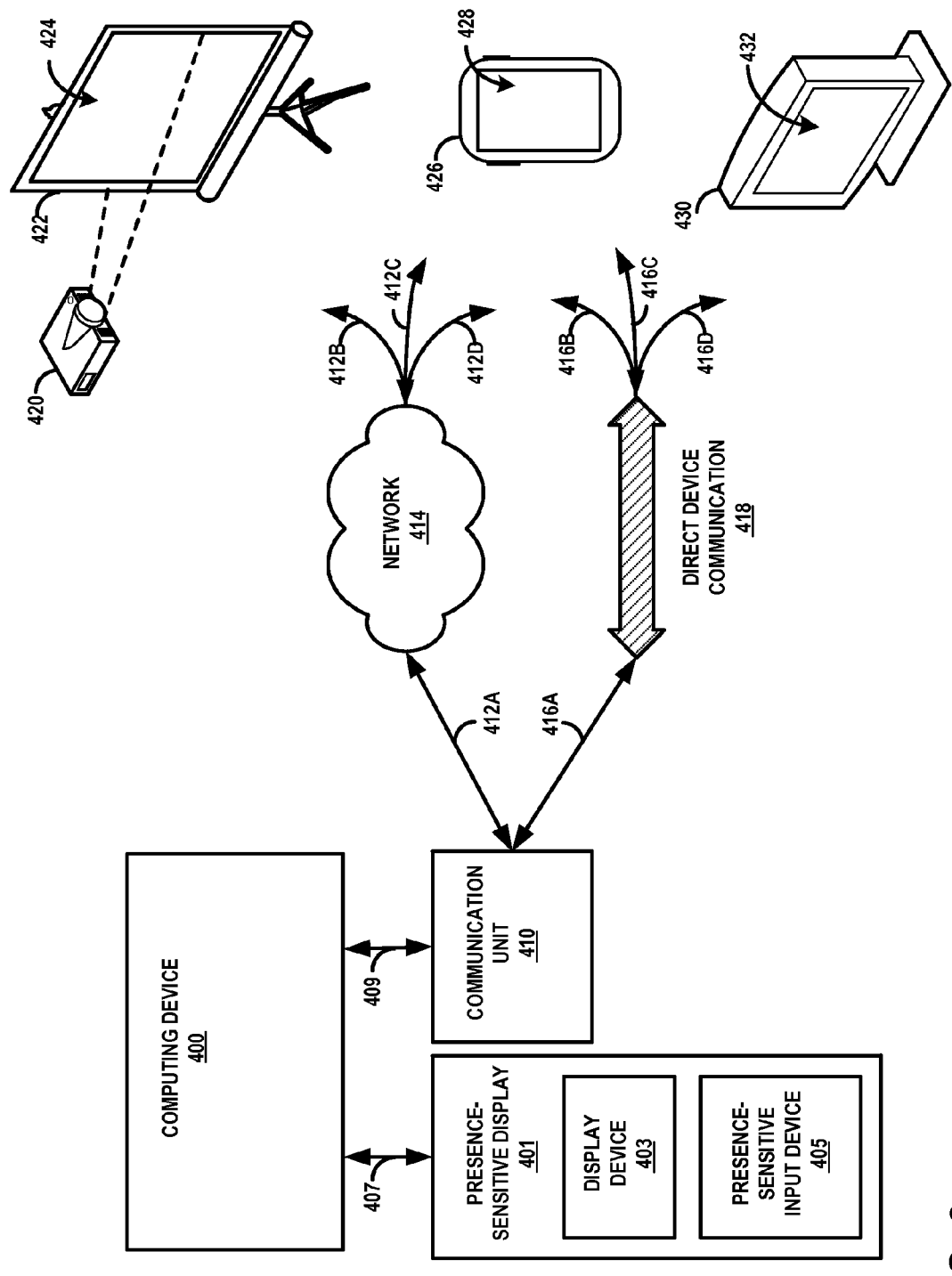
FIG. 6 is a block diagram illustrating an example computing device that outputs graphical content for display at a remote device, in accordance with illustrative aspects of this disclosure.

FIG. 6 is a block diagram illustrating an example computing device that outputs graphical content for display at a remote display device, in accordance with one or more techniques of the present disclosure. Graphical content, generally, may include any visual information that may be output for display, such as text, images, a group of moving images, etc. The example shown in FIG. 6 includes a computing device 400, presence-sensitive display 401, communication unit 410, projector 420, projector screen 422, tablet device 426, and visual display device 430. Computing device 400, projector 420, projector screen 422, tablet device 426, and/or visual display device 430 of FIG. 6 may be an implementation of computing device 10 of FIGS. 1-4. Although shown for purposes of example in FIGS. 1-4 as a stand-alone computing device 10, a computing device of this disclosure may generally be any component or system that includes a processor or other suitable computing environment for executing software instructions and, for example, need not include a presence-sensitive display.

As shown in the example of FIG. 6, computing device 400 may be a processor or a set of processors (e.g., a multiple-core processor, a chipset, an arbitrarily distributed group of processors that are at least temporarily communicatively coupled, etc.) that includes functionality as described with respect to processor(s) 200 of FIG. 2. In such examples, computing device 400 may be operatively coupled to an input and/or output device such as presence-sensitive display 401 by a communication channel 407, which may be a system bus, communication fabric, or other suitable connection, from any proximate or remote location. Computing device 400 may also be operatively coupled to communication unit 410, further described below, by a communication channel 409, which may also be a system bus or other suitable connection. Although shown separately as an example in FIG. 6, computing device 400 may be at least temporarily operatively coupled to presence-sensitive display 401 and communication unit 410 by any number of one or more communication channels.

In other examples, such as illustrated previously with computing device 10 in FIGS. 1-4, computing device 400 may be an integrated device or system that includes both one or more processors and an input and/or output device such as presence-sensitive display 401 as integrated or otherwise operatively coupled components of computing device 400. In examples such as these, one or more processors of computing device 400 may include functionality as described with respect to processor(s) 200 of FIG. 2, and may receive data from and send data to the presence-sensitive display component of computing device 400. In various examples, computing device 400 may be or include a portable or mobile device such as a mobile phone (e.g., a smartphone), a tablet computer, a laptop computer, etc. In other examples, computing device 400 may be or include a desktop computer, a tablet computer, a smart television platform, a camera, a game console, a personal digital assistant (PDA), a mainframe, a data center, a real or virtual server, one or more devices executing a virtual server, etc. In other examples, computing device 400 may include both a local device containing both one or more processors and an input and/or output device (e.g., a presence-sensitive display), as well as one or more processors that are operatively connected to but separate or remote from the local device or the input and/or output device.

Presence-sensitive display 401, as shown in FIG. 6, may be an implementation of presence-sensitive display 12 as shown in FIGS. 1-4. Presence-sensitive display 401 may include display device 403 and presence-sensitive input device 405. Display device 403 may, for example, receive data encoding graphical content from computing device 400 and display the graphical content. In some examples, presence-sensitive input device 405 may determine one or more user inputs (e.g., continuous gestures, multi-touch or non-contact multi-indication gestures, single-touch or non-contact single-indication gestures, etc.) at presence-sensitive display 401. In some examples, presence-sensitive input device 405 may be physically positioned adjacent to (e.g., in a transparent overlay with) display device 403. As described above with reference to FIGS. 1 and 2, presence-sensitive input device 405 may be configured to detect touch gesture inputs and/or contactless gesture inputs by visual, infrared, acoustic, remote capacitance, or other type of signals, using capacitive, inductive, optical recognition, and/or other techniques. Presence-sensitive input device 405 may send indications of such contact or contactless user input gestures to computing device 400 using communication channel 407. When a user makes an input gesture indicating the position of a graphical element displayed by display device 403, presence-sensitive input device 405 may detect that the input gesture indicates the location of display device 403 at which the graphical element is displayed.

As shown in FIG. 6, computing device 400 may also include and/or be operatively coupled with communication unit 410. Communication unit 410 may include functionality of communication unit(s) 216, including network interface 204, as described in reference to FIG. 2. Examples of communication unit 410 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 400 may also include and/or be operatively coupled with one or more other devices, e.g., input devices, output devices, memory, storage devices, etc. that are not shown in FIG. 6 for purposes of brevity and illustration.

FIG. 6 also illustrates a projector 420 and projector screen 422. Other such examples of projection devices may include electronic whiteboards, holographic display devices, wearable display devices, and any other suitable devices for displaying graphical content. Projector 420 and/or project screen 422 may include one or more communication units that enable the respective devices to communicate with computing device 400. In some examples, the one or more communication units may enable communication between projector 420 and projector screen 422. Projector 420 may receive data from computing device 400 that encodes graphical content. Projector 420, in response to receiving the data, may project the graphical content onto projector screen 422. In some examples, projector 420 may determine one or more user inputs (e.g., continuous gestures, multi-touch or non-contact multi-indication gestures, single-touch or non-contact single-indication gestures, etc.) at projector screen 422, or proximate to or within detection range of projector 420 or projector screen 422, using optical recognition or other suitable techniques and send indications of such user input using one or more communication units to computing device 400.

Projector screen 422, in some examples, may include a presence-sensitive display 424. Presence-sensitive display 424 may include a subset of functionality or all of the functionality of presence-sensitive display 12 as described in this disclosure. In some examples, presence-sensitive display 424 may include additional functionality. Projector screen 422 (e.g., an electronic whiteboard), may receive data encoding graphical content from computing device 400 and display the graphical content. In some examples, presence-sensitive display 424 may determine one or more user inputs (e.g., continuous gestures, multi-touch gestures, single-touch gestures, etc.) at, proximate to, or within detection range of projector screen 422 using capacitive, inductive, and/or optical recognition techniques and send indications of such user input using one or more communication units to computing device 400.

FIG. 6 also illustrates tablet device 426 and visual display device 430. Tablet device 426 and visual display device 430 may each include computing and connectivity capabilities. Examples of tablet device 426 may include e-reader devices, convertible notebook devices, hybrid slate devices, etc. Examples of visual display device 430 may include televisions, computer monitors, etc. As shown in FIG. 6, tablet device 426 may include a presence-sensitive display 428. Visual display device 430 may include a presence-sensitive display 432. Presence-sensitive displays 428, 432 may include a subset of functionality or all of the functionality of presence-sensitive display 12 as described in this disclosure. In some examples, presence-sensitive displays 428, 432 may include additional functionality. Presence-sensitive display 432, for example, may receive data encoding graphical content from computing device 400 and display the graphical content. In some examples, presence-sensitive display 432 may determine one or more user inputs (e.g., continuous gestures, multi-touch or non-contact multi-indication gestures, single-touch or non-contact single-indication gestures, etc.) at, proximate to, or within detection range of projector screen using capacitive, inductive, and/or optical recognition techniques and send indications of such user input using one or more communication units to computing device 400.

As described above, in some examples, computing device 400 may output graphical content for display at presence-sensitive display 401 that is coupled to computing device 400 by a system bus or other suitable communication channel. Computing device 400 may also output graphical content for display at one or more remote devices, such as projector 420, projector screen 422, tablet device 426, and visual display device 430. For instance, computing device 400 may execute one or more instructions to generate and/or modify graphical content in accordance with techniques of the present disclosure. Computing device 400 may output the data that encodes the graphical content to a communication unit of computing device 400, such as communication unit 410. Communication unit 410 may send the data to one or more of the remote devices, such as projector 420, projector screen 422, tablet device 426, and/or visual display device 430. In this way, computing device 400 may output the graphical content for display at one or more of the remote devices. In some examples, one or more of the remote devices may output the graphical content at a presence-sensitive display that is included in and/or operatively coupled to the respective remote devices.

In some examples, computing device 400 may not output graphical content at presence-sensitive display 401 that is operatively coupled to computing device 400. In other examples, computing device 400 may output graphical content for display at both a presence-sensitive display 401 that is coupled to computing device 400 by communication channel 407, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 400 and output for display at presence-sensitive display 401 may be different than graphical content display output for display at one or more remote devices.

Computing device 400 may send and receive data using any suitable communication techniques. For example, computing device 400 may be operatively coupled to network 414 using network link 412A. Each of the remote devices illustrated in FIG. 6 may be operatively coupled to network 414 by one of respective network links 412B, 412C, and 412D. Network 414 may include network hubs, network switches, network routers, etc., that are operatively intercoupled thereby providing for the exchange of information between computing device 400 and the remote devices illustrated in FIG. 6. In some examples, network links 412A-412D may include Ethernet, Asynchronous Transfer Mode (ATM), or other network connections. Such connections may include wireless and/or wired connections. Computing device 400 (e.g., all or a portion of a real or virtual server, a data center, etc.) may be operatively coupled to remote devices of FIG. 6 via network 414 from any arbitrarily proximate or remote location.

In some examples, computing device 400 may be operatively coupled to one or more of the remote devices included in FIG. 6 using direct device communication 418. Direct device communication 418 may include communications through which computing device 400 sends and receives data directly with a remote device, using wired or wireless communication. That is, in some examples of direct device communication 418, data sent by computing device 400 may not be forwarded by one or more additional devices before being received at the remote device, and vice-versa. Examples of direct device communication 418 may include Bluetooth, Near-Field Communication (NFC), Universal Serial Bus (USB), Wi-Fi, Wi-Gig, infrared, etc. One or more of the remote devices illustrated in FIG. 6 may be operatively coupled with computing device 400 by communication links 416A-416D. In some examples, communication links 412A-412D may be connections using Bluetooth, NFC, USB, Wi-Fi, Wi-Gig, infrared, etc. Such connections may include wireless and/or wired connections.

In accordance with techniques of the disclosure, computing device 400 may be operatively coupled to projector 420, projector screen 422, tablet device 426, and/or visual display device 430 using network 414 and/or direct device communication 418. Computing device 400 may output a graphical user interface including various graphical content at presence-sensitive display 424 of projector screen 422, presence-sensitive display 428 of tablet device 426, and/or presence-sensitive display 432 of visual display device 430. Computing device 400 may send data implementing a graphical keyboard enabled with gesture cancellation features to be outputted at presence-sensitive display 424 of projector screen 422, presence-sensitive display 428 of tablet device 426, and/or presence-sensitive display 432 of visual display device 430 (collectively, "presence-sensitive displays 424, 428, 432"), with gesture cancellation features based at least in part on receiving indications of user input gestures indicating cancellation of prior gesture inputs, in accordance with one or more aspects of this disclosure. Presence-sensitive displays 424, 428, 432 are illustrative of any one or more presence-sensitive displays of any arbitrary number of any kind of devices that may be operatively coupled to computing device 400.

In these examples corresponding to FIG. 6, computing device 400 may receive an indication of a user input gesture detected at a presence-sensitive display (e.g., presence-sensitive display 424 of projector screen 422, presence-sensitive display 428 of tablet device 426, and/or presence-sensitive display 432 of visual display device 430) operatively coupled to computing device 400, such that the user input gesture comprises a motion with respect to the presence-sensitive display. Presence-sensitive displays 424, 428, 432 may be operatively coupled to computing device 400 via network 414 or via direct device communication 416, as described above. Projector 420, projector screen 422, tablet device 426, and/or visual display device 430 may transmit data that includes an indication of a user input gesture, including a gesture cancellation feature, detected at presence-sensitive displays 424, 428, 432, respectively, via network 414 and/or direct communication device 418 to communication unit 410. Communication unit 410 may receive the data including the indication of the gesture, and communicate this data to computing device 400. In other examples, another presence-sensitive input device operatively coupled to computing device 400, such as presence-sensitive input device 405, may remotely detect a user input gesture of a user interacting with projector screen 422, tablet device 426, and/or visual display device 430. Presence-sensitive input device 405 may send data that includes an indication of a user input gesture, including a gesture cancellation feature, detected at presence-sensitive input device 405 to computing device 400.

Computing device 400 may thus receive data that includes an indication of a user input gesture, including a gesture cancellation feature, detected at a presence-sensitive input device. Computing device 400 (e.g., computing device 10, or one or more processors forming part or all of computing device 10), executing a gesture cancellation module (e.g., gesture cancellation module 122 described above with reference to FIGS. 1 and 2), may determine, based at least in part on the indication of the gesture, that the gesture includes at least one feature associated with a cancellation of the selected sequence of one or more keys (e.g., gesture cancellation features 21, 321, 323). Computing device 400 may, in response to determining that the gesture includes the at least one feature associated with the cancellation, omit the selected sequence of one or more keys from entry to a text input field (e.g., text input field 17) to be outputted at one or more of presence-sensitive displays 424, 428, 432.

Computing device 400 may then send data encoding a graphical user interface (e.g., GUI 11) incorporating gesture cancellation features to projector 420, projector screen 422, tablet device 426, and/or visual display device 430, for output at presence-sensitive display 424, 428, and/or 432, respectively. For example, computing device 400 may send this data to communication unit 410. Communication unit 410 may then send the data via network 414 and/or direct device communication 418 to projector 420, projector screen 422, tablet device 426, and/or visual display device 430. Projector 420, projector screen 422, tablet device 426, and/or visual display device 430 may then output the graphical user interface, modified in accordance with gesture cancellation features, at presence-sensitive displays 424, 426, and/or 432, respectively.

Various techniques described herein may be implemented in software that may be written in any of a variety of languages, making use of any of a variety of toolsets, frameworks, APIs, programming environments, virtual machines, libraries, and other computing resources, as indicated above. For example, software code may be written in C, C++, Go, Python, Ruby, JavaScript, Dart, Clojure, assembly language, machine code, or any other language. As one specific illustrative example, aspects of the disclosure discussed above may be implemented in a software module written in a high-level programming language that is executable on virtual machine 198 of FIG. 2, for example.

Aspects of the disclosure may be equally applicable and implemented in any computing device or any operating system, and using any other APIs, frameworks, or toolsets. Aspects described herein for implementing a graphical keyboard with gesture cancellation may interact with any other data store or application. When implemented in software or firmware, various techniques disclosed herein may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that comprise non-transitory media. The term "non-transitory" indicates that the storage medium is not embodied in a carrier wave or a propagated signal. In certain examples, a non-transitory storage medium may store data that can, over time, change (e.g., in RAM or cache). Data storage devices may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format. In some examples, executable instructions may not be stored permanently in the local data storage comprised in a computing device and may be received temporarily from an external resource, such as from a web service, data center, and/or other server-side resource, yet those executable instructions may still be buffered, cached, or otherwise stored temporarily in a buffer memory, cache memory, processor registers, or other temporary memory comprised in the computing device. In these examples, the computing device may still comprise a computer-readable storage medium on which the executable instructions are stored, even if only temporarily.

Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-6, as well as additional embodiments, are within the scope of one or more of the following claims.

What is claimed is:

1. A method comprising:
   outputting, by a computing device and for display at a presence-sensitive display, a graphical user interface comprising a text input field and a graphical keyboard that includes a group of keys;
   receiving, by the computing device, an indication of an initial portion of a continuous gesture;
   determining, by the computing device, based on an initial portion of the continuous gesture, a sequence of keys from the group of keys;
   outputting, by the computing device, for display at the text input field of the graphical user interface, one or more characters associated with the sequence of keys determined based on the initial portion of the continuous gesture;
   after receiving the indication of the initial portion of the continuous gesture, receiving, by the computing device, an indication of a subsequent portion of the continuous gesture;
   responsive to determining that at least one feature of the subsequent portion of the continuous gesture indicates a user intended cancellation of the initial portion and the subsequent portion of the continuous gesture, determining, by the computing device, a probability that the subsequent portion of the continuous gesture in combination with the initial portion of the continuous gesture represents a selection letters to complete any potential word in a language model of the computing device, wherein the at least one feature comprises a zigzag pattern having first and second groups of vertices that are each associated with a respective area of the graphical user interface that is substantially the same size or smaller than one of the keys in the graphical keyboard;
   after outputting the one or more characters at the text input field of the graphical user interface and in response to determining that the probability is below a threshold, omitting, by the computing device, from the text input field of the graphical user interface, all characters determined based on the continuous gesture including the one or more characters associated with the sequence of keys determined based on the initial portion of the continuous gesture.

2. The method of claim 1, wherein the at least one feature of the subsequent portion of the continuous gesture comprises a determined location of the graphical user interface associated with the subsequent portion of the gesture.

3. The method of claim 2, wherein the determined location of the graphical user interface comprises the text input field.

4. The method of claim 2, wherein the determined location of the graphical user interface comprises a non-textual character key in the group of keys of the graphical keyboard.

5. The method of claim 4, wherein the non-textual character key comprises a space bar in the group of keys of the graphical keyboard.

6. The method of claim 1, wherein the at least one feature of the subsequent portion of the continuous gesture comprises a determined shape.

7. The method of claim 1, wherein the at least one feature of the subsequent portion of the continuous gesture comprises a determined path over time.

8. The method of claim 7, wherein the determined path over time comprises a path that extends back and forth more than once within a confined area of the graphical keyboard.

9. The method of claim 8, wherein the confined area is substantially the same width or narrower than a width of one of the keys in the graphical keyboard.

10. The method of claim 1, wherein determining that the probability is below the threshold comprises processing, by the computing device, a path of the continuous gesture based on one or more of: the language model, a comparison with adjacent keys, and a model of gesture input motions.

11. The method of claim 1, wherein the at least one feature of the subsequent portion of the continuous gesture comprises a determined path along the graphical user interface.

12. The method of claim 11, wherein the determined path extends from within the graphical keyboard to an edge of the graphical keyboard.

13. The method of claim 11, wherein the determined path extends from within the graphical keyboard to outside the graphical keyboard.

14. A computing device, comprising:
   at least one processor; and
   a memory configured to store instructions that when executed cause the at least one processor to:
     output, for display at a presence-sensitive display, a graphical user interface comprising a text input field and a graphical keyboard that includes a group of keys;
       receive an indication of an initial portion of a continuous gesture;
     determine, based on the initial portion of the continuous gesture, a sequence of keys from the group of keys;
     output, for display at the text input field of the graphical user interface, one or more characters associated with the sequence of keys determined based on the initial portion of the continuous gesture;
     after receiving the indication of the initial portion of the continuous gesture, receive an indication of a subsequent portion of the continuous gesture;
     responsive to determining that at least one feature of the subsequent portion of the continuous gesture indicates a user intended cancellation of the initial portion and the subsequent portion of the continuous gesture, determine a probability that the subsequent portion of the continuous gesture in combination with the initial portion of the continuous gesture represents a selection of letters to complete any potential word in a language model of the computing device,
       wherein the at least one feature comprises a zigzag pattern having first and second groups of vertices that are each associated with a respective area of the graphical user interface that is substantially the same size or smaller than one of the keys in the graphical keyboard; and
     after outputting the one or more characters at the text input field of the graphical user interface and in response to determining that the probability is below a threshold, omit, from the text input field of the graphical user interface, all characters determined based on the continuous gesture including the one or more characters associated with the sequence of keys determined based on the initial portion of the continuous gesture.

15. The computing device of claim 14, wherein the at least one feature of the subsequent portion of the continuous gesture comprises a determined location of the graphical user interface.

16. The computing device of claim 14, wherein the at least one feature of the subsequent portion of the continuous gesture comprises a determined shape.

17. The computing device of claim 14, wherein the at least one feature of the subsequent portion of the continuous gesture comprises a determined path along the graphical user interface.

18. A non-transitory computer-readable storage medium encoded with instructions executable by at least one processor to:
   output, for display at a presence-sensitive display, a graphical user interface comprising a text input field and a graphical keyboard that includes a group of keys;
   receive an indication of an initial portion of a continuous gesture;
   determine, based on the initial portion of the continuous gesture, a sequence of keys from the group of keys;
   output, for display at the text input field, one or more characters associated with the sequence of keys determined based on the initial portion of the continuous gesture;
   after receiving the indication of the initial portion of the continuous gesture, receive an indication of a subsequent portion of the continuous gesture;
   responsive to determining that at least one feature of the subsequent portion of the continuous gesture indicates a user intended cancellation of the initial portion and the subsequent portion of the continuous gesture, determine a probability that the subsequent portion of the continuous gesture in combination with the initial portion of the continuous gesture represents a selection of letters to complete any potential word in a language model of the computing device, wherein the at least one feature comprises a zigzag pattern having first and second groups of vertices that are each associated with a respective area of the graphical user interface that is substantially the same size or smaller than one of the keys in the graphical keyboard; and
   after outputting the one or more characters at the text input field of the graphical user interface and in response to determining that the probability is below a threshold, omit, from the text input field of the graphical user interface, all characters determined based on the continuous gesture including the one or more characters determined based on the initial portion of the continuous gesture.

19. The non-transitory computer-readable storage medium of claim 18, wherein the at least one feature of the subsequent portion of the continuous gesture comprises a determined location of the graphical user interface.

20. The non-transitory computer-readable storage medium of claim 18, wherein the at least one feature of the subsequent portion of the continuous gesture comprises a determined shape.

21. The non-transitory computer-readable storage medium of claim 18, wherein the at least one feature of the subsequent portion of the continuous gesture comprises a determined path along the graphical user interface.

22. The method of claim 1, further comprising:
   after receiving the indication of the subsequent portion of the continuous gesture, receiving, by the computing device, an indication of a third portion of the continuous gesture;
   determining, by the computing device, based only on the third portion of the continuous gesture, a word in the language model;
   after omitting the one or more characters from the text input field of the graphical user interface, outputting, by the computing device for display at the text input field of the graphical user interface, the word.

23. The method of claim 22, wherein the continuous gesture is a single gesture continuously being detected by the presence-sensitive display while receiving the indications of initial portion of the continuous gesture, the subsequent portion of the continuous gesture, and the third portion of the continuous gesture.

24. The computing device of claim 14, wherein the instructions, when executed, further cause the at least one processor to:
   after receiving the indication of the subsequent portion of the continuous gesture, receive an indication of a third portion of the continuous gesture;

determine, based only on the third portion of the continuous gesture, a word in the language model;

after omitting the one or more characters from the text input field of the graphical user interface, output, for display at the text input field of the graphical user interface, the word.

25. The computing device of claim 24, wherein the continuous gesture is a single gesture continuously being detected by the presence-sensitive display while the at least one processor receives the indications of initial portion of the continuous gesture, the subsequent portion of the continuous gesture, and the third portion of the continuous gesture.

26. The non-transitory computer-readable storage medium of claim 18, wherein the instructions, when executed, further cause the at least one processor to:

after receiving the indication of the subsequent portion of the continuous gesture, receive an indication of a third portion of the continuous gesture;

determine, based only on the third portion of the continuous gesture, a word in the language model;

after omitting the one or more characters from the text input field of the graphical user interface, output, for display at the text input field of the graphical user interface, the word.

27. The non-transitory computer-readable storage medium of claim 26, wherein the continuous gesture is a single gesture continuously being detected by the presence-sensitive display while the at least one processor receives the indications of initial portion of the continuous gesture, the subsequent portion of the continuous gesture, and the third portion of the continuous gesture.

* * * * *

UNITED STATES PATENT AND TRADEMARK OFFICE
CERTIFICATE OF CORRECTION

PATENT NO. : 9,569,107 B2  
APPLICATION NO. : 13/866680  
DATED : February 14, 2017  
INVENTOR(S) : Shumin Zhai et al.

Page 1 of 1

It is certified that error appears in the above-identified patent and that said Letters Patent is hereby corrected as shown below:

Column 24, Line 15 (Claim 1): "represents a selection letters to" should read --represents a selection of letters to--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*